United States Patent [19]

Lorenz

[11] 3,746,887

[45] July 17, 1973

[54] CONDITION RESPONSIVE A. C. PHASE ANGLE CONTROL CIRCUITRY

[75] Inventor: Jerome L. Lorenz, Columbus, Ohio

[73] Assignee: Ranco Incorporated, Columbus, Ohio

[22] Filed: Sept. 9, 1971

[21] Appl. No.: 179,071

[52] U.S. Cl. .......... 307/252 B, 307/252 F, 307/293, 307/305, 323/37, 323/40

[51] Int. Cl. ... H03k 17/66, H03k 17/72, G05f 1/40

[58] Field of Search ..................... 307/252 B, 252 F, 307/252 D, 252 G, 252 N, 252 Q, 252 T, 262, 284, 293, 305; 317/141 S; 323/34, 36, 37, 38, 39, 40

[56] References Cited

UNITED STATES PATENTS

| | | | |
|---|---|---|---|
| 3,603,843 | 9/1971 | Clements | 307/252 T X |
| 3,348,131 | 10/1967 | Banks | 307/252 B X |
| 3,381,212 | 4/1968 | Peltola | 307/252 B X |
| 3,257,566 | 6/1966 | White | 307/252 D |
| 3,571,665 | 3/1971 | Hayden | 317/148.5 B X |
| 3,417,296 | 12/1968 | Wallentowitz | 307/293 X |
| 3,558,922 | 1/1971 | Galloway | 307/252 B |
| 3,579,096 | 5/1971 | Buchanan, Jr. | 323/36 X |
| 3,229,379 | 1/1966 | Heidtmann | 307/293 X |
| 3,244,965 | 4/1966 | Gutzwiller | 307/262 X |
| 3,346,874 | 10/1967 | Howell | 307/305 X |
| 3,484,623 | 12/1969 | Cain | 307/262 X |
| 3,633,047 | 1/1972 | Kadah | 307/305 X |
| 3,636,379 | 1/1972 | Moe et al. | 307/252 F |

OTHER PUBLICATIONS

Fox, "How to Putter With the Put"; Radio–Electronics, p. 50–52, 10/1970.

Spofford, Jr., "The D13T–A Programmable Unijunction Transistor", G. E. Application Note 90.70, 11/67.

Rozenboom, "Diac Triggering of Thyristors & Triacs", pgs. 90–91, 93; Electronic Applications, Vol. 28, No. 3.

Stasior, "Silicon Controlled Switches"; Application Note 90.16, 6/64.

*Primary Examiner*—John W. Huckert
*Assistant Examiner*—L. N. Anagnos
*Attorney*—Linn J. Raney et al.

[57] ABSTRACT

A condition responsive A.C. phase angle control circuit is disclosed which comprises a gated control switch for a load and condition responsive circuitry governing operation of the control switch. The condition responsive control circuit comprises an A.C. condition sensing bridge and a triggerable device which provides positive going and negative going gating pulses to the control switch in response to bridge output signals. The triggerable device can be formed by an integrated circuit defining a programmable unijunction transistor circuit and an SCR circuit.

8 Claims, 3 Drawing Figures

INVENTOR.
JEROME L. LORENZ
BY Watts, Hoffmann, Fisher & Heinke
ATTORNEYS.

CONDITION RESPONSIVE A. C. PHASE ANGLE CONTROL CIRCUITRY

BACKGROUND OF THE INVENTION

1. Field of the Invention

The present invention relates to control circuitry and more particularly relates to A.C. phase angle control circuitry for governing the A.C. power supply phase angle at which a load is energized to thereby control energization of the load.

2. The Prior Art

The prior art has proposed A.C. phase control circuits in which A.C. electrical loads are connected across a power supply through gated electronic switches. These switches have comprised SCRs or gated A.C. semiconductor switches. The control switch is rendered conductive at a particular power supply phase angle so that the load is energized during the remainder of the power supply half cycle. The power supplied to the load is varied by varying the phase angle at which the switch becomes conductive.

Condition responsive triggering circuits have been employed for controlling the phase angle at which the electronic switch is rendered conductive. These circuits have frequently required filtered or unfiltered D.C. voltages in order to operate as intended. This has required the inclusion of rectifiers and associated components in the triggering circuits. Furthermore, these circuits have sometimes required the use of saturable reactors and pulse transformers in order to transmit properly timed triggering impulses of appropriate polarity to the electronic switches.

Moreover, certain condition sensing elements, e.g., some positive temperature coefficient resistances and humidity sensors, are not readily used in these D.C. triggering circuits due to polarization effects which are adverse to their reliability.

A.C. condition responsive triggering circuits of various designs have also been proposed but these circuits have exhibited pronounced hysteresis effects, or have had low gains, or have been unduly sensitive to power supply voltage changes.

SUMMARY OF THE INVENTION

The present invention provides a new and improved A.C. phase angle control circuit wherein the power supplied to an A.C. load is governed by an electronic switch and wherein a condition responsive A.C. triggering circuit controls the conductivity of the electronic switch.

The electronic switch is connected across an A.C. power supply in series with the load. The electronic switch is preferably a gated device which is capable of full wave conduction. Such an electronic switch is rendered fully conductive substantially instantaneously in response to a triggering pulse provided to its gate electrode. The load is energized throughout the remainder of each power supply half cycle during which the electronic switch is rendered conductive.

The triggering circuit preferably comprises an A.C. condition responsive bridge and a triggerable A.C. switching device which provides triggering pulses to the gate of the electronic switch in response to voltage differentials across outputs of the bridge circuit. The bridge circuit is preferably connected in parallel with the electronic switch and in series with a voltage dropping impedance which limits current in the bridge and prevents energization of the load when the electronic switch is in a nonconductive state. The bridge has first and second branches each defining an output terminal. One branch includes a condition sensing impedance element for varying the instantaneous voltage across the bridge output terminals in response to sensed changes in a physical condition such as temperature or humidity.

A voltage phase angle shift is provided in one branch of the bridge so that the voltage wave forms appearing at the bridge outputs are slightly out of phase. In the preferred embodiment, a capacitor is connected in one branch of the bridge to produce the phase angle shift. The phase angle shift between the branches of the bridge enables the polarity of the voltage across the bridge output terminals to change during each half cycle of the power supply. The power supply phase angle at which the bridge output polarity changes depends on the sensed condition.

One important feature of the new circuit resides in the construction of the switching device. The switching device is connected across the bridge output terminals and had an output terminal connected to the gate of the electronic switch. The switching device provides pulses to the electronic switch gate during power supply half cycles of opposite polarity at power supply phase angles determined by the sensed condition. In the preferred embodiment, the switching device comprises a silicon controlled rectifier (SCR) circuit having its gate connected to a first output terminal of the bridge and its anode and cathode electrodes connected between the electronic switch gate and the second bridge output terminal. The switching device also comprises a programmable unijunction transistor (PUT) having a gate connected to the first bridge output terminal and its anode and cathode connected between the second bridge output terminal and the electronic switch gate. The PUT and SCR are connected in parallel and are poled to conduct oppositely so that triggering pulses can be provided to the gate of the electronic switch during power supply half cycles of opposite polarity. This enables phase angle controlled full wave energization of the load.

The PUT is rendered conductive at the power supply phase angle at which the voltage at its anode is more positive than the voltage at its gate. Conduction of the PUT renders the electronic switch conductive throughout the remainder of the power supply half cycle. The PUT is effective to render the electronic switch conductive only during first alternate power supply half cycles, i.e., half cycles having a given polarity relative to a reference voltage.

The SCR is rendered conductive during alternate power supply half cycles of opposite polarity to those in which the PUT conducts and at phase angles at which the SCR gate voltage is positive relative to the voltage at its cathode. When the SCR conducts the electronic switch is rendered conductive during second alternate power supply half cycles of opposite polarity to the first alternate power supply half cycles.

The novel interconnection of the PUT and SCR circuits provides a triggerable switching device which is extremely simple and which avoids the complex constructions proposed by the prior art. The triggerable switching device can be formed by a five layer integrated circuit which further simplifies the circuitry.

Other features and advantages of the invention will become apparent from the following detailed description made with reference to the accompanying drawings which form a part of the specification.

DETAILED DESCRIPTION OF A PREFERRED EMBODIMENT

Figure 1:
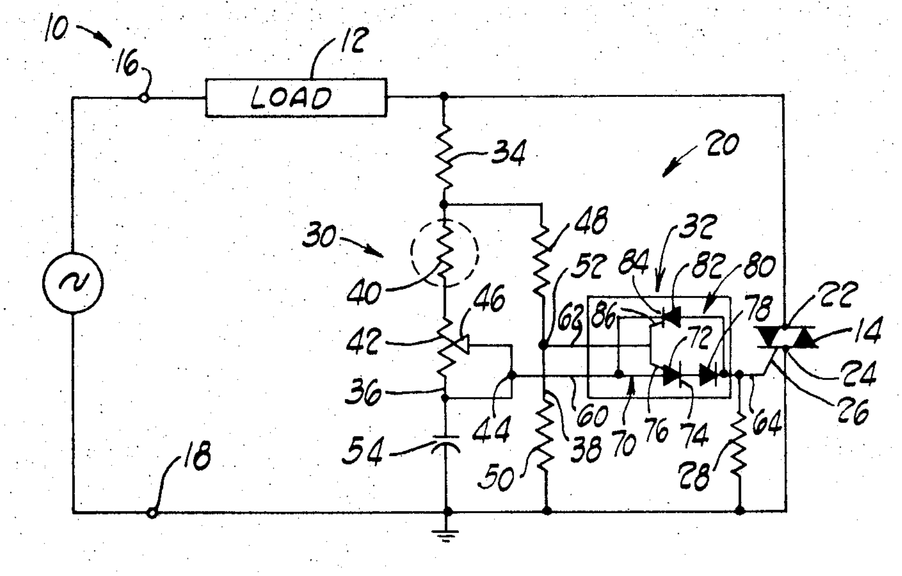
FIG. 1 is a schematic diagram of a condition responsive phase angle control circuit embodying the present invention.

A condition responsive phase angle control circuit 10 embodying the present invention is illustrated in FIG. 1. The circuit 10 includes a load 12 and an electronic load control switch 14 which is connected in series with the load across the terminals 16, 18 of a single phase alternating current power supply. The conductivity of the switch 14 is governed by a condition responsive control circuit 20. The switch 14 is capable of conduction during positive and negative half cycles of the power supply and the control circuit 20 functions to render the switch 14 conductive at phase angles of the power supply half cycles which vary according to variations in a sensed condition. The power supplied to the load is therefore a function of the sensed condition.

One example of an application of such a phase angle control circuit is in controlling the speed of a fan for a heat exchanger in accordance with sensed temperature. In such an application, the load 12 is an A.C. induction motor which drives a blower. The speed of the motor is infinitely variable as a function of a temperature sensed at or adjacent the heat exchanger.

The electronic switch 14 is preferably a gated A.C. switch of the type which is commercially available from General Electric Co. under the trademark TRIAC. The switch 14 has power electrodes 22, 24 connected in series with the load 12. A gate electrode 26 is connected to the power supply terminal 18 through a gate resistor 28. For the purposes of this description the power supply terminal 18 is considered grounded or at a reference voltage and the voltage at the power supply terminal 16 is considered to be alternately positive and negative relative to that reference level. During positive half cycles of the power supply, i.e., when the terminal 16 is positive with respect to the terminal 18, the switch 14 is rendered fully conductive when the voltage at the gate 26 is positive with respect to the voltage at the power electrode 24. The switch 14 remains conductive until the voltage across the power electrodes falls to about zero volts. During negative half cycles of the power supply, i.e., when the terminal 16 is negative with respect to the terminal 18, the switch 14 is rendered fully conductive when the voltage at the gate 26 is negative with respect to the voltage at the power electrode 24. The switch 14 remains conductive until the voltage across the power electrodes again falls to about zero volts.

The voltage level at the gate 26 is governed by the control circuit 20 which includes an A.C. bridge 30 and a triggerable switch device 32. The device 32 is connected between the bridge 30 and the gate 26. The bridge 30 and switching device 32 are connected in parallel with the switch 14 across the power supply terminals through a voltage dropping resistor 34 which limits the current in the control circuitry while preventing the load 12 from being energized when the switch 14 is in a nonconductive state.

The bridge 30 includes parallel branches 36, 38. The branch 36 includes a condition responsive resistance element 40 and a potentiometer 42. The branch 36 defines a voltage output terminal 44 which is electrically connected to a slider 46 of the potentiometer 42. The condition responsive impedance element 40 can be of any suitable type; for example, the element 40 can be a positive temperature coefficient resistance element, a thermistor, a humidity sensing element, etc. In any event, the instantaneous voltage at the output terminal 44 varies according to the resistance of the element 40 which in turn depends on a sensed condition.

The branch 38 is comprised of series connected resistors 48, 50 and an output terminal 52 between these resistors. In the illustrated embodiment, the resistors 48, 50 have fixed values so that the instantaneous voltage at the terminal 52 is always proportional to the voltage applied across the branch 38.

Figure 2:
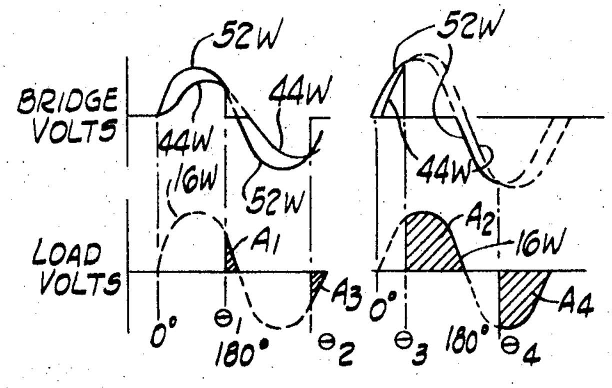
FIG. 2 illustrates voltage wave forms appearing across selected points of the circuit of FIG. 1; and, FIG. 3 shows an equivalent circuit of a portion of the circuitry shown in FIG. 1.

A phase angle shifting capacitor 54 is connected in the bridge arm 36 in series with the potentiometer 32 and the resistor 40. The capacitor 54 causes the voltage waveform at the bridge output terminal 44 to lag slightly behind the power supply voltage and the voltage wave form at the output terminal 52 which is in phase with the power supply. The capacitor 54 is of a relatively small size so that the shift in phase angle of the voltage waveform at the output terminal 44 lags the wave form at the output terminal 52 by only a few degrees, e.g., 10°. The relationship between the voltage waveforms at the bridge output terminals 44, 52, referenced to the power supply terminal 18, are shown in FIG. 2. The waveform indicated by the reference character 44W indicates the voltage waveform at the output terminal 44. The waveform at the terminal 52 is indicated by the reference character 52W.

Referring to FIG. 2, as the voltage at the power supply terminal 16 rises relative to the voltage at the power supply terminal 18 during a positive half cycle of the power supply, the voltage level at the bridge output terminal 52 leads and remains positive relative to the voltage at the bridge output terminal 44 between the power supply phase angles O and $\theta_1$. At the power supply phase angle $\theta_1$ the voltage at the output terminal 44 becomes positive relative to the voltage at the output terminal 52. The "crossing over" of the voltage waveforms 52W, 44W at the phase angle $\theta_1$ is due to the phase angle shift between the bridge branches as well as to the resistance of the element 40 which controls the amplitude of the waveform 44W. The voltage at the bridge output terminal 44 remains positive with respect to the voltage at the bridge terminal 52 through a power supply phase angle of 180°.

During negative half cycles of the power supply, the waveform 52W remains negative relative to the waveform 44W from the power supply phase angle of 180° to a phase angle of $\theta_2$ at which time the voltage at the output terminal 52 becomes positive relative to the voltage at the output terminal 44.

As the condition sensed by the resistor 40 changes in a manner which reduces the resistance of the element 40, the amplitude of the waveform 44W increases although its phase relationship with the waveform 52W remains substantially the same. Consequently, the crossover point of the waveforms 52W, 44W occurs much earlier in each half cycle of the power supply. An earlier crossover is illustrated as occurring at the power supply phase angles of $\theta_3$ and $\theta_4$ of FIG. 2. It should be pointed out that the crossover points of the waveforms 52W and 44W can occur substantially at any point during any half cycle of the power supply except at very small phase angles. This limitation is due to the lagging nature of the waveform 44W. The phase angle at which the waveforms cross over is thus dependent primarily on the resistance of the element 40.

The triggerable switching device 32 includes input leads 60, 62 connected to the bridge output terminals 44, 52, respectively, and an output lead 64 connected to the gate 26 of the switch 14. During a positive half cycle of the power supply when the voltage at the output terminal 44 becomes positive relative to the voltage at the output terminal 52, the device 32 is immediately rendered conductive to transmit a positive going pulse to the gate 26 of the switch 14 from the bridge output terminal 44 through the lead 60 and the device 32 through the output 64 and gate resistor 28. This renders the switch 14 conductive to energize the load. When the device 32 is triggered at the phase angle $\theta_1$, the load 12 is energized relatively late in the power supply half cycle and remains energized between the power supply phase angles $\theta_1$ and 180°. The power supplied to the load during this segment of the power supply half cycle is illustrated by the shaded area $A_1$ under the power supply waveform 16W of FIG. 2. When the resistance of the element 40 is reduced, the amplitude of the waveform 44W increases and the switch 14 is rendered conductive earlier in each power supply half cycle. Such a condition is illustrated at the right side of FIG. 2 where the load is energized during the segment of the power supply half cycle illustrated by the shaded area $A_2$ under the waveform 16W.

During negative half cycles of the power supply voltage, the device 32 is rendered conductive when the voltage at the terminal 52 becomes positive relative to the voltage at the output terminal 44. When this occurs the device 32 produces a negative going pulse at the gate 26 which renders the switch 14 conductive so that the load 12 is energized throughout the remainder of the negative half cycle. The switch 14 remains conductive until the voltage at the power supply terminal 16 crosses through zero volts. Energization of the load 12 during the negative power supply half cycles at different phase angles is indicated by the shaded areas A3, A4 beneath the power supply waveform 16W in FIG. 2.

In the preferred embodiment, the device 32 comprises a programmable unijunction transistor circuit (PUT) 70 comprising an anode 70, a cathode 74 and a gate 76. The anode 72 is connected to the bridge output terminal 44 through the lead 60 and the cathode 74 is connected to the output lead 64 through a diode 78 which forms part of the device 32. The diode 78 is employed to protect the PUT 70 from damage due to the application of reverse polarity voltage across it. The anode gate 76 is connected to the bridge output terminal 52 through the lead 62. The PUT 70 functions so that when the anode becomes positive relative to the gate, the PUT is rendered conductive to provide a current pulse from the bridge output terminal 44 to the power supply terminal 18 through the lead 60, the anode 72, the cathode 74, the diode 78, the lead 64 and the resistor 28. This results in the aforementioned positive going pulse to the gate 26 of the switch 14 which renders the switch conductive.

The device 32 further comprises an SCR circuit 80 which includes an anode 82, a cathode 84 and a gate 86. The anode 82 is connected to the lead 64 while the cathode 84 is connected to the bridge output terminal 44 through the conductor 60. The gate 86 is connected to the bridge output terminal 52 becomes positive relative to the voltage at the bridge output terminal 44, the SCR circuit 80 is rendered conductive to establish a circuit from the power supply terminal 18 through the resistor 28, the lead 64, the anode 82, the SCR cathode 84, the lead 60 and to the terminal 44. This provides a negative going pulse at the gate 26 of the switch 14 rendering the switch conductive during the remainder of the negative half cycle of the power supply.

Figure 3:
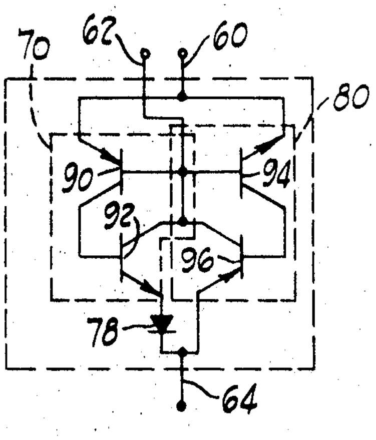

The switching device 32 can be constructed using integrated circuit techniques and when so constructed comprises a five or six layer chip. FIG. 3 illustrates an equivalent circuit of the switching device 32 when constructed as an integrated circuit. The PUT circuit 70 is illustrated as including transistors 90, 92. The transistor 90 is a PNP transistor having its emitter connected to the lead 60 and its base connected to the lead 62. The transistor 92 is an NPN transistor having its base connected to the collector of the transistor 90. The collector of the transistor 92 is connected to the base of the transistor 90 to provide regenerative feedback. When the voltage level at the lead 60 becomes positive relative to the lead 62 the transistor 90 is rendered conductive so that the voltage level at the base of the transistor 92 is increased relative to its emitter. This causes the transistor 92 to become conductive resulting in both of the transistors 90, 92 being rendered fully conductive. Conduction of the transistors and establishes a circuit from the lead 60 through the transistors 90, 92, the diode 78 and to the lead 64.

The SCR circuit 80 is defined by transistors 94 and 96. The transistor 94 is an NPN transistor having its base connected to the lead 62 and its emitter connected to the lead 60. The transistor 96 is a PNP transistor having its emitter electrode connected to the lead 64, its base connected to the collector of the transistor 94. The collector of the transistor 96 is connected to the base of the transistor 94 to provide regenerative feedback. When the voltage level at the lead 62 becomes positive relative to the voltage level at the lead 60 the transistor 94 becomes conductive which results in both transistors 94 and 96 becoming fully conductive to establish a circuit from the lead 64 through the transistors 96, 94 and the lead 60.

It is apparent from FIG. 3 that the device 32 can be constructed entirely from solid state semi-conductor devices and that the device 32 therefore lends itself to a construction utilizing integrated circuit production techniques.

While a single embodiment of the present invention has been illustrated and described herein in considerable detail, the invention is not to be considered limited to the precise construction shown. It is the intention to cover hereby all adaptations, modifications and uses of the invention which come within the scope of the appended claims.

What is claimed is:

1. A condition responsive circuit for controlling the power supplied to a load from an A.C. power supply comprising:

a. electronic switch means having power electrodes connected in series with the load and gate electrode means, said switch means capable of conduction during positive and negative power supply half cycles at variable power supply phase angles;

b. an electronic gating circuit connected to said gate electrode means for providing positive going gate signals to said gate electrode means during positive power supply half cycles at phase angles dependent upon a sensed condition and negative going gate signals to said gate electrode means during negative power supply half cycles at phase angles dependent upon the sensed condition whereby the load is energizable through said switch means during positive and negative power supply half cycles at phase angles dependent upon the sensed condition, said gating circuit comprising:

1. condition responsive bridge circuit means having first and second branches connected in parallel with said switch means and supplied with alternating current from said power supply;

2. signal transmitting circuit means defining a signal transmitting circuit connected between the first branch of said bridge circuit means and said gate electrode means, said signal transmitting circuit means further defining control electrode means connected to the second branch of said bridge means, said control electrode means controlling conductivity of said signal transmitting circuit whereby when the voltage applied to said control electrode means reaches a predetermined magnitude relative to the voltage applied to said signal transmitting circuit said signal transmitting circuit is rendered conductive to transmit a gate signal to said gate electrode means;

3. at least one of said bridge circuit means branches comprising a condition responsive impedance element for varying the alternating current impedance of said branch in response to a sensed condition; and, 4. means for shifting the phase of the alternating current voltage applied across one branch of said bridge circuit means relative to the phase of the alternating current voltage applied across said other branch of said bridge circuit means.

2. The circuit claimed in claim 1 wherein said signal transmitting circuit means comprises a PUT and an SCR, said PUT and SCR having gate electrodes connected to said second branch of said bridge circuit means, said phase shifting means connected in said first branch of said bridge circuit means.

3. The circuit claimed in claim 2 wherein said phase shifting means comprises a capacitor connected in series with said first branch of said bridge circuit means for causing the voltage waveform in said first branch to lag the voltage waveform in said second branch of said bridge circuit means.

4. A circuit as claimed in claim 2 further comprising voltage dropping impedance means connected in series between said power supply and said condition responsive bridge circuit means.

5. The circuit claimed in claim 1 wherein said A.C. switch means comprises a TRIAC.

6. A condition responsive control circuit for governing the alternating current power supplied to a load from an alternating current power supply by controlling the power supply phase angles at which the load is energized comprising:

a. an electronic control switch comprising power electrode means connected between the load and the alternating current power supply, said control switch further comprising gate electrode means for initiating conduction of said control switch at substantially any given power supply phase angle during positive and negative power supply half cycles in response to positive going and negative going signals, respectively, supplied to said gate electrode means;

b. condition responsive alternating current bridge circuit means connected across the power supply and comprising first and second branches each having an output terminal, at least one of said branches having an impedance which varies in relation to changes in a sensed condition so that the alternating current voltage across said bridge output terminals at any given power supply phase angle depends upon the sensed condition;

c. phase shifting means associated with said bridge circuit means for shifting the phase of the voltage at one output terminal relative to the phase of the voltage at said other output terminal, said phase shifting means effective to reverse the polarity of the voltage across said bridge output terminals during any power supply half cycle between a relatively small power supply phase angle and a power supply phase angle of substantially 180° depending on the sensed condition;

d. triggerable switch means defining an input circuit connected across said bridge output terminals and an output circuit connected to said gate means, said switch means rendered conductive during positive and negative power supply half cycles when the polarity of the voltage across said bridge output terminals has reversed and thereby rendering said control switch conductive to energize said load.

7. A circuit as claimed in claim 6 wherein said triggerable switch means defines a PUT circuit and an SCR circuit connected in parallel and oppositely poled, the gates of said PUT and SCR connected together and defining part of said input circuit.

8. A circuit as claimed in claim 6 wherein said phase shifting means comprises a capacitor connected in series with one of said branches.

* * * * *